US008243589B1

(12) United States Patent
Trost et al.

(10) Patent No.: US 8,243,589 B1
(45) Date of Patent: Aug. 14, 2012

(54) SYSTEMS AND METHODS FOR DATA CENTER LOAD BALANCING

(75) Inventors: Christopher S. Trost, San Antonio, TX (US); Donald E. Clemons, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 40 days.

(21) Appl. No.: 12/191,993

(22) Filed: Aug. 14, 2008

(51) Int. Cl.
*G01R 31/08* (2006.01)
(52) U.S. Cl. ........................................ 370/220; 370/235
(58) Field of Classification Search ........................ None
See application file for complete search history.

(56) References Cited

U.S. PATENT DOCUMENTS

| | | | | |
|---|---|---|---|---|
| 7,272,613 B2 * | 9/2007 | Sim et al. | ...................... | 707/102 |
| 7,490,164 B2 * | 2/2009 | Srivastava | ..................... | 709/238 |
| 7,512,702 B1 * | 3/2009 | Srivastava et al. | ............ | 709/238 |
| 2002/0141343 A1 * | 10/2002 | Bays | .............................. | 370/235 |
| 2006/0036761 A1 * | 2/2006 | Amra et al. | .................... | 709/238 |
| 2006/0193247 A1 | 8/2006 | Naseh et al. | | |
| 2006/0193252 A1 | 8/2006 | Naseh et al. | | |
| 2006/0195607 A1 | 8/2006 | Naseh et al. | | |
| 2008/0072226 A1 * | 3/2008 | Armes et al. | .................. | 718/101 |
| 2009/0201800 A1 * | 8/2009 | Naseh et al. | .................. | 370/217 |

\* cited by examiner

*Primary Examiner* — Nittaya Juntima
*Assistant Examiner* — Rhonda Murphy
(74) *Attorney, Agent, or Firm* — Brooks, Cameron & Huebsch, PLLC

(57) ABSTRACT

Systems and methods for data center availability comprising a first data center having a first address associated therewith and a second data center operable to assume the first address upon the first data center becoming unavailable. The present disclosure in particular provides these systems and methods for an autonomous intranet, wherein the autonomous intranet may include two or more data centers, each provided with a load balancer for advertising a common single-host Internet Protocol address upstream for the respective data centers under certain conditions.

18 Claims, 5 Drawing Sheets

SYSTEMS AND METHODS FOR DATA CENTER LOAD BALANCING

CROSS REFERENCE TO RELATED APPLICATIONS

This application is related in subject matter to, and incorporates herein by reference in its entirety, each of the following: U.S. patent application entitled "SYSTEMS AND METHODS FOR DATA CENTER LOAD BALANCING," U.S. patent application Ser. No. 12/191,979, filed on the same date as this application; and U.S. patent application entitled "SYSTEMS AND METHODS FOR DATA CENTER LOAD BALANCING," U.S. patent application Ser. No. 12/191,985, also filed on the same date as this application.

This application is related in subject matter to, and incorporates herein by reference in its entirety, each of the following U.S. patent applications (each entitled "HIGH-AVAILABILITY DATA CENTER" and filed Sep. 19, 2006): Ser. No. 11/533,248; Ser. No. 11/533,262; and Ser. No. 11/533,272.

This application is further related in subject matter to, and incorporates herein by reference in its entirety, each of the following U.S. patent applications (each entitled "SYSTEMS AND METHODS FOR NON-SPECIFIC ADDRESS ROUTING" and filed on the same date as this application): U.S. patent application Ser. No. 12/188,187; U.S. patent application Ser. No. 12/188,188; and U.S. patent application Ser. No. 12/188,190.

This application is further related in subject matter to, and incorporates herein by reference in its entirety, each of the following U.S. patent applications: Ser. No. 11/065,871 "DISASTER RECOVERY FOR ACTIVE-STANDBY DATA CENTER USING ROUTE HEALTH AND BGP" (published application US20060193247); Ser. No. 11/066,955 "APPLICATION BASED ACTIVE-ACTIVE DATA CENTER NETWORK USING ROUTE HEALTH INJECTION AND IGP" (published application US20060195607), and Ser. No. 11/067,037 "ACTIVE-ACTIVE DATA CENTER USING RHI, BGP, AND IGP ANYCAST FOR DISASTER RECOVERY AND LOAD DISTRIBUTION" (published application US20060193252)—each by Naseh and Gundi.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Embodiments disclosed herein relate generally to data center availability; and, more specifically, embodiments relate to system for data center availability wherein one data center may assume the responsibilities of another data center. The improved system in particular may relate to systems and methods for load balancing between data centers, particularly in autonomous intranet embodiments.

Many organizations use servers connected to the Internet to provide information and service to customers and potential customers. When a primary server experiences a failure of some sort, customers may be notified, redirected to a backup server, or may lose their connection entirely. In any case, customers' interaction with the organization suffers, and their opinion or impression of the organization may suffer as well.

A data center is a facility that houses computing systems for a particular business, industry, governmental entity, or other organization. Such computing systems may include, for example, one or more server farms that perform various functions for the organization. Examples of such functions include hosting web sites, storing information, and providing processing for computing applications, among others. Other computing systems may be housed in a data center for performing other functions.

Security of information and application processing associated with a data center may be critical to particular organizations. Various efforts have been made to enhance the security of data centers. For example, some data centers are provided with physical security such as housing the data center in an inconspicuous location, providing restricted access to the data center, providing the data center with environmental isolation and control, and providing electrical power supply redundancy to the data center. Another element of security that has been added to data center design is to provide an organization with more than one physical data center, e.g., providing multiple data centers at different locations.

Providing "redundant" or "backup" data centers may provide an organization with the ability to protect data center functionality against harmful factors that extend beyond the scope of the organization's control over a single data center. For example, a single data center may be vulnerable to physical failure, e.g., from terrorist activity, fire, earthquake, etc. A single data center may be vulnerable to electronic failure, e.g., "hacker" activity such as viruses, broadcast storms, denial of service attacks, and the like. A single data center may be vulnerable to electric and/or telecommunications failure of such a magnitude that provided systems internal to the data center are unable to mitigate the failure. Other failures that reduce or eliminate the functionality of a single data center are possible. In such instances, having additional data centers at separate geographic locations may provide the organization with the ability to maintain data center functionality after the loss of a single data center.

An organization may desire to provide "always-on" service from data centers such that a client using the functionality of the data centers perceives continuous service during a failover from one data center to another and during simultaneous operation of multiple active data centers. Some methods have been proposed to provide such "always-on" service to clients connecting via the Internet. For example, each of the following U.S. patent applications: Ser. No. 11/065,871 "DISASTER RECOVERY FOR ACTIVE-STANDBY DATA CENTER USING ROUTE HEALTH AND BGP", Ser. No. 11/066,955 "APPLICATION BASED ACTIVE-ACTIVE DATA CENTER NETWORK USING ROUTE HEALTH INJECTION AND IGP", and Ser. No. 11/067,037 "ACTIVE-ACTIVE DATA CENTER USING RHI, BGP, AND IGP ANYCAST FOR DISASTER RECOVERY AND LOAD DISTRIBUTION"—all to Naseh et al., describe the use of border gateway protocol (BGP) and advertisement of a block of IP addresses, e.g., 24.24.24.0/24, on a subnet basis for the respective data centers (this application again incorporates herein by reference in its entirety each of these applications).

The above-mentioned efforts to enhance the security of data centers may themselves create issues. For example, a networking issue for organizations that maintain multiple active data centers is session persistence. If route maps change during a client session (for example, because changes in network usage cause changes in a shortest network path), traffic from one client for one session may be routed to more than one data center. For example, if two active data centers advertise the same block of Internet protocol (IP) addresses, a client may generally be routed via the shortest topographic path, using one of a number of routing metrics, to one of the data centers. However, the "shortest" path may change during the pendency of the session, e.g., as network traffic at various points throughout the network changes. In some circumstances, such changes could cause a route to a different data center to become "shorter" than the route initially taken by client traffic. This may be particularly problematic for lengthy client sessions (for example, sessions associated with financial transactions performed over a network).

Route convergence is an example of a networking issue for organizations that maintain an active data center with a passive backup data center that may become active upon failover. When a network topology changes, e.g., due to a failure, some routers on the network may receive updated network information and use the updated information to recompute routes and/or rebuild routing tables. On a large-scale network, e.g., the Internet, route convergence may take a significant amount of time with respect to the duration of some client sessions, possibly allowing a client to become aware of a network problem, e.g., by receiving a failure dialog on a network interface. A client may store domain name system (DNS) records locally, e.g., a cache of IP addresses corresponding to websites. Such DNS records may come with a particular time to live (TTL) value that, if not expired, may prevent such DNS records from being refreshed, which may slow the route convergence process and/or allow the client to receive a failure dialog on a network interface.

SUMMARY

A system for data center availability is disclosed comprising a first data center having a first IP address associated therewith and a second data center operable to assume the first address upon the first data center becoming unavailable. The data centers may reside on separate networks connected to the Internet. The second data center may be associated with a second IP address until the first data center becomes unavailable. The system may include a load balancer that monitors the data centers and triggers a second data center's assumption of a first IP address. The system may also include a third data center located remotely with respect to first and second data centers and operable to assume a first address when both first and second data centers are unavailable (see following U.S. patent applications, each again herein incorporated by reference in its entirety, each entitled "SYSTEMS AND METHODS FOR NON-SPECIFIC ADDRESS ROUTING" and filed on the same date as this application: U.S. patent application Ser. No. 12/188,187; U.S. patent application Ser. No. 12/188,188; and U.S. patent application Ser. No. 12/188, 190. An improved system in particular may be found in autonomous intranet embodiments.

In one or more embodiments, an autonomous intranet system may include a first data center including a first load balancer that advertises a single-host IP address upstream for the first data center. The autonomous intranet system may also include a second data center including a second load balancer that advertises the single-host IP address upstream for the second data center. Traffic from a client on the autonomous intranet system may be routed to one of the first and second data centers using interior gateway protocol (IGP).

According to one or more embodiments, a method for operating an autonomous intranet system may include advertising a single-host IP address upstream with a first load balancer for a first data center. The method may also include advertising the single-host IP address upstream with a second load balancer for a second data center. The method may further include routing traffic from a client on the autonomous intranet system to one of the first and second data centers using IGP.

One or more embodiments may include a computing device readable medium having instructions stored thereon, which, when executed by a processor, cause a device to perform a method, including receiving a single-host IP address advertised upstream from a first load balancer for a first data center. The method also may include receiving the single-host IP address advertised upstream from a second load balancer for a second data center. The method may further include routing traffic from a client on an intranet system to one of the first and second data centers using IGP.

In one or more embodiments, an autonomous intranet system may include a first data center having a number of servers and a first load balancer that advertises a single-host IP address upstream for the first data center. The autonomous intranet system also may include a second data center having a number of counterpart servers to the number of servers for the first data center and a second load balancer that advertises the single-host IP address upstream for the second data center. The first load balancer may perform a first health check on the number of servers and may cease to advertise the single-host IP address for the first data center when results of the first health check fail to meet certain criteria. The first and second data centers may be connected to the autonomous intranet system using IGP.

According to one or more embodiments, a method for operating an autonomous intranet system may include providing a first data center with a number of servers and a first load balancer connected to the autonomous intranet system using IGP. The method also may include providing a second data center with a number of counterpart servers to the number of servers for the first data center and a second load balancer connected to the autonomous intranet system using IGP. The method further may include advertising a single-host IP address upstream with the first load balancer for the first data center and advertising the single-host IP address upstream with the second load balancer for the second data center. The method may include performing a first health check on the number of servers and ceasing to advertise the single-host IP address for the first data center when results of the health check fail to meet certain criteria.

One or more embodiments may include a computing device readable medium having instructions stored thereon, which, when executed by a processor, cause a device to perform a method, including advertising a single-host IP address upstream with a first load balancer for a first data center having a number of servers. The single-host IP address may be the same as that advertised upstream by a second load balancer for a second data center having a number of counterpart servers to the number of servers for the first data center. The first and second data centers may be connected to an autonomous intranet system using IGP. The method also may include performing a first health check on the number of servers and ceasing to advertise the single-host IP address for the first data center when results of the health check fail to meet certain criteria.

In one or more embodiments, an autonomous intranet system may include a first data center having a number of servers and a first load balancer that receives health check information from the number of servers. The autonomous intranet system also may include a second data center having a number of counterpart servers to the number of servers for the first data center and a second load balancer. The first load balancer may advertise a single-host IP address upstream and to the second load balancer based on received health check information from the number of servers. The second load balancer may advertise the single-host IP address upstream for the second data center when the second load balancer ceases to receive the advertised single-host IP address from the first load balancer.

According to one or more embodiments, a method for operating an autonomous intranet system may include receiving health check information from a number of servers in a first data center with a first load balancer. The method may also include advertising, with the first load balancer, a single-host IP address for the first data center upstream and to a second load balancer based on the received health check information. The method further may include advertising the single-host IP address upstream with the second load balancer for a second data center having a number of counterpart servers to the number of servers for the first data center when the second load balancer ceases receiving the advertised single-host IP address from the first load balancer.

One or more embodiments may include a computing device readable medium having instructions stored thereon, which, when executed by a processor, cause a device to perform a method, including receiving a single-host IP address advertised upstream from a first load balancer for a first data center based on received health check information from a number of servers in the first data center. The method may also include receiving the single-host IP address advertised upstream from a second load balancer for a second data center, having a number of counterpart servers to the number of servers in the first data center, when the second load balancer ceases receiving the advertised single-host IP address from the first load balancer.

DETAILED DESCRIPTION

Figure 1:
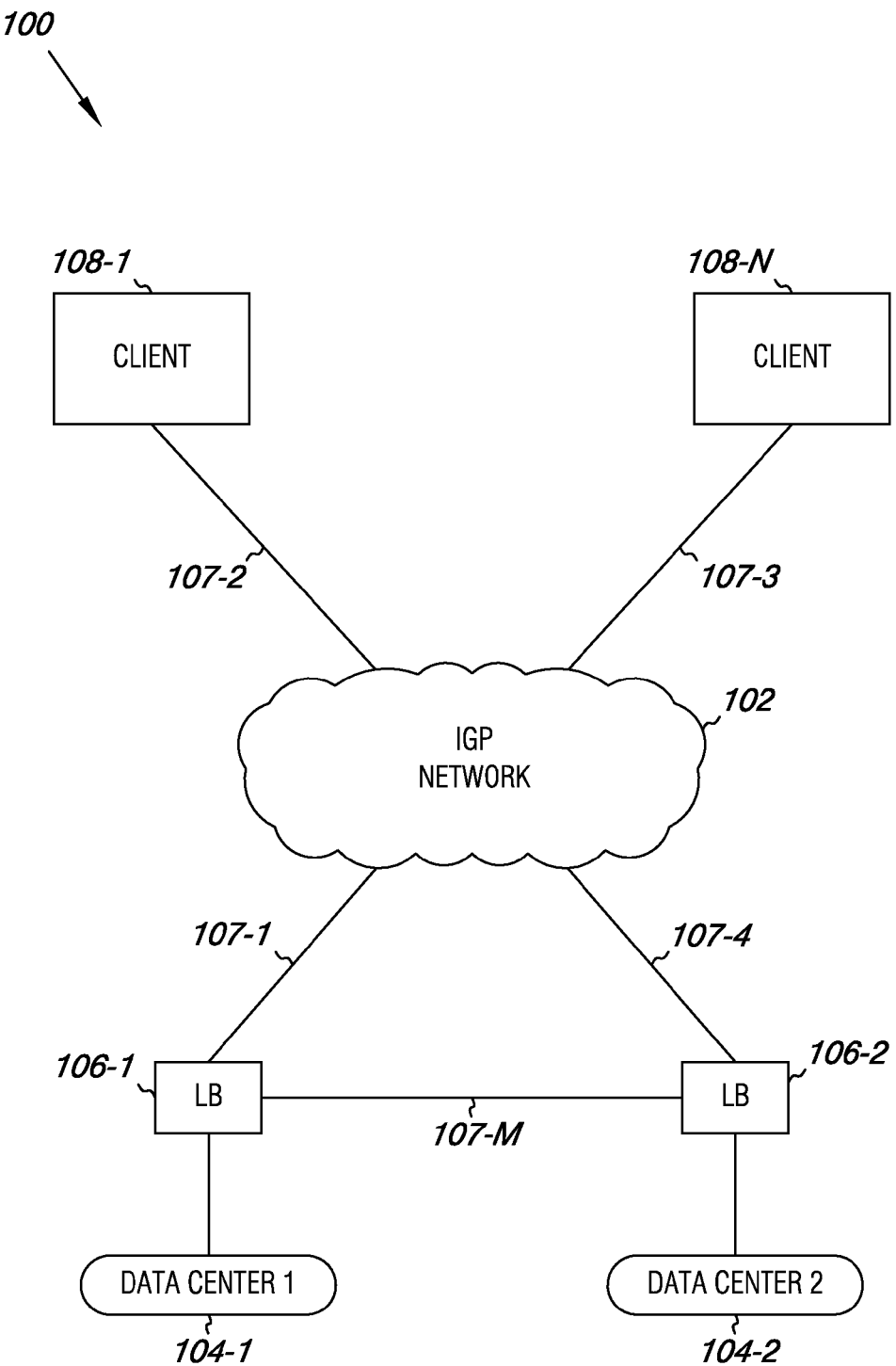
FIG. 1 illustrates a high level block diagram of an autonomous intranet system according to one or more embodiments.

The Figures described above and the written description of specific structures and functions provided herein are not presented to limit the scope of what Applicants have invented or the scope of the appended claims. Rather, the Figures and written description are provided to teach any person skilled in the art to make and use that for which patent protection is sought. Those skilled in the art will appreciate that not all features of a commercial embodiment are described or shown for the sake of clarity and understanding. Persons of skill in this art will also appreciate that the development of an actual commercial embodiment incorporating various aspects of this disclosure may require numerous implementation-specific decisions to achieve the developer's ultimate goal for the commercial embodiment. Such implementation-specific decisions may include, and likely are not limited to, compliance with system-related, business-related, government-related standards and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the embodiments disclosed and taught herein are susceptible to numerous and various modifications and alternative forms. Also, the use of a singular term, such as, but not limited to, "a," is not intended as limiting of the number of items. Furthermore, the use of relational terms, such as, but not limited to, "top," "bottom," "left," "right," "upper," "lower," "down," "up," "side," and the like are used in the written description for clarity in specific reference to the Figures and are not intended to limit the scope of embodiments or the appended claims.

Particular embodiments may be described below with reference to block diagrams and/or operational illustrations of methods. It will be understood that each block of the block diagrams and/or operational illustrations, and combinations of blocks in the block diagrams and/or operational illustrations, may be implemented by analog and/or digital hardware, and/or computer program instructions. Such computer program instructions may be provided to a processor of a general-purpose computer, special purpose computer, ASIC (application specific integrated circuit), and/or other programmable data processing system. The executed instructions may create structures and functions for implementing the actions specified in the block diagrams and/or operational illustrations. In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

Computer programs for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package.

In general, Applicants have created a system for data center availability comprising a first data center having a first address associated therewith and a second data center operable to assume the first address upon the first data center becoming unavailable. The improved system in particular may relate to systems and methods for load balancing between data centers, particularly in autonomous intranet embodiments.

Although the present disclosure is not limited to providing only a system and method for load balancing between data centers in an autonomous intranet, it in particular provides such systems and methods. The autonomous intranet may include two or more data centers, each provided with a load balancer for advertising a common single-host Internet Protocol (IP) address upstream for the respective data centers under certain conditions.

Reference is made herein to the accompanying drawings that form a part of the present disclosure, and in which is shown by way of illustration how one or more embodiments of the disclosure may be practiced. These embodiments are described in sufficient detail to enable those of ordinary skill in the art to practice the described embodiments, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element in the drawing. Similar elements between different figures may be identified by the use of similar digits. For example, 102 may reference the element "102" in FIG. 1, and a similar element may be referenced as 202 in FIG. 2.

Referring to FIG. 1, a high level block diagram is illustrated of an autonomous intranet system 100 according to one or more embodiments. An autonomous intranet is a network or collection of networks under the control of a single organization, e.g., the organization may have a common routing policy for the autonomous intranet. The autonomous intranet system 100 includes an interior gateway protocol (IGP) network cloud 102 indicating a number of network interconnections, e.g., routers. Two data centers 104-1 and 104-2 are illustrated, each connected to a load balancer 106-1 and 106-2 respectively. Furthermore, the load balancers 106-1 and 106-2 are illustrated with an interconnection to each other and an interconnection to the IGP network cloud 102. Two clients 108-1 and 108-N are illustrated interconnected to the IGP network cloud 102. The designator "N" indicates that a number of clients may be interconnected with the IGP network cloud 102.

The interconnection 107-M between load balancers 106-1 and 106-2 may be a secure high-bandwidth link, e.g. a private T3 line. The interconnection between load balancers may provide a direct communication link between load balancers associated with data centers, e.g., data centers 104-1 and 104-2. Embodiments are not limited to autonomous intranet systems having a direct interconnection between load balancers. Load balancers may share information via a routed network path, e.g., through IGP network 102.

Each of the interconnections 107-1, 107-2, 107-3, 107-4, and 107-M illustrated in FIG. 1 represents an IGP link, as the embodiment illustrated in FIG. 1 is an autonomous intranet system. The designator "M" is used to indicate that a number of interconnections may be included with the autonomous intranet system 100. That is, one organization, e.g., one company, may exercise topographic control over the network. Although the autonomous intranet system 100 may be connected, e.g., via border gateway protocol (BGP) to the Internet, such a connection is not illustrated herein so as not to obfuscate various embodiments. As such, clients, e.g., client 108-1, connect to the IGP network 102 via an intranet connection. Clients, such as clients 108-1, may be computing devices connected to the IGP network 102, e.g., a computing device operated by an employee of the organization exercising topographic control over the autonomous intranet system 100. Embodiments are not limited to employee-clients; other client-types are possible.

Data centers, e.g., data center 104-1, may include a number of server farms including various servers, such as web servers, application servers, file servers, email servers, print servers, database servers, etc. A server farm may include multiple servers facilitating one or more common and/or different functions. For example, an email server farm could include multiple servers cooperatively providing access to email for an organization operating and/or leasing the server farm. A server farm may include servers providing functions different from one another, e.g., application servers, email servers, web servers, etc. An organization operating two data centers, e.g. data centers 104-1 and 104-2, may use one data center, e.g., data center 104-2 as a failover in case the other data center, e.g., data center 104-1, loses some or all of its functionality. That is, a second data center may include a number of counterpart server farms and/or counterpart servers that may be functionally equivalent to the number of server farms and/or servers associated with a first data center.

Load balancers may balance network traffic, e.g., from a number of clients, both within a particular data center, e.g., data center 104-1, and between a number of data centers, e.g., data centers 104-1 and 104-2. As will be described in more detail below, load balancers may receive health check information from a number of servers in a data center. In one or more embodiments, a load balancer may perform a health check on a number of servers to determine whether the servers are functional, e.g., whether traffic should continue to be routed to the servers. Such information may be used by a load balancer to initiate a failover between data centers, as described in more detail below.

Figure 2:
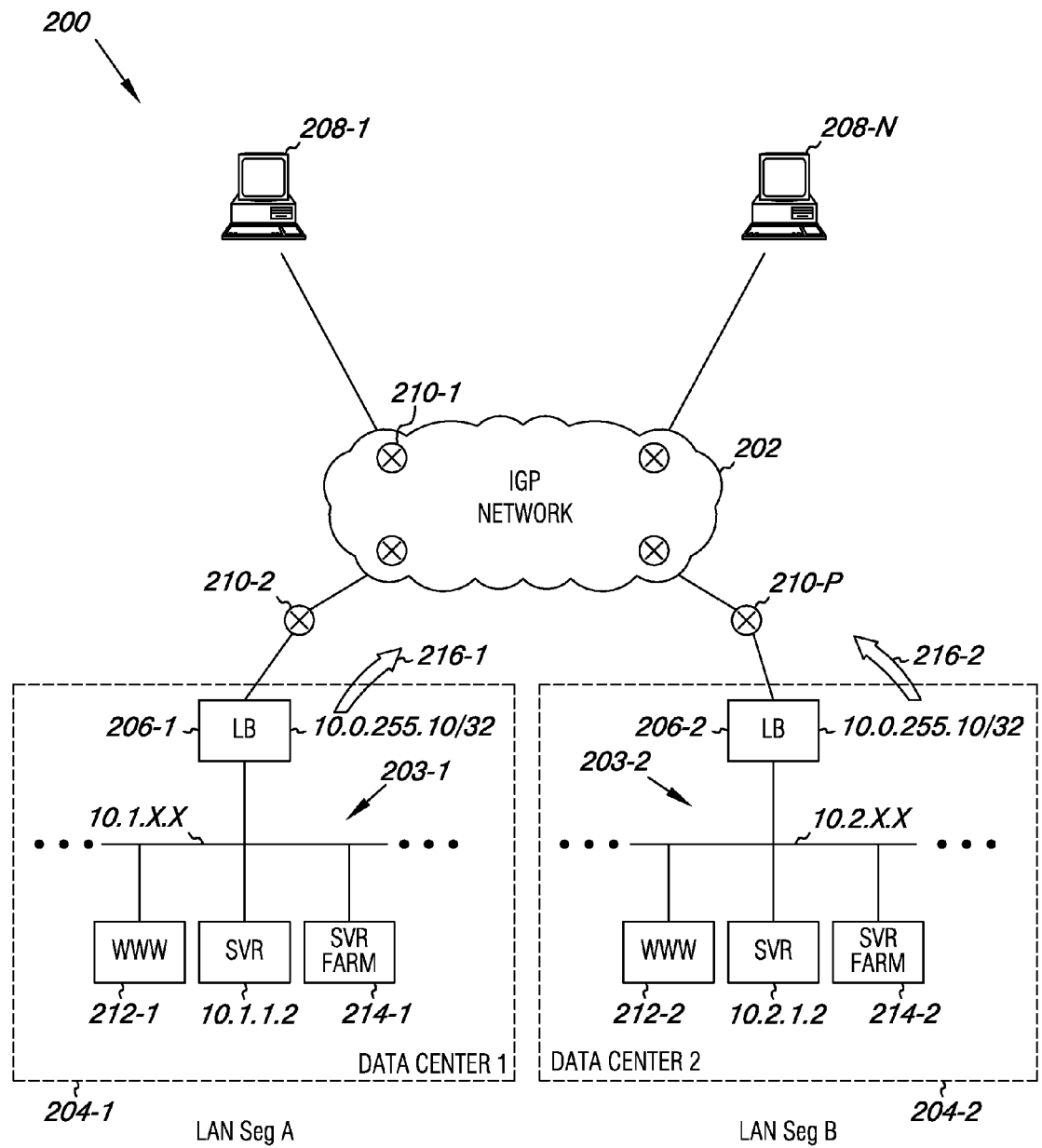
FIG. 2 illustrates a bock diagram of an autonomous intranet system having two active data centers according to one or more embodiments.

Referring to FIG. 2, in one or more embodiments, various components of the autonomous system 200 may include logic, a microprocessor, a micro-controller, an application specific integrated circuit, or the like. The processor may be interfaced with a memory configured to provide storage of a set of computer readable instructions in the form of software, firmware, and/or hardware that provides functionality. The interfaced memory may be implemented as a combination of volatile and non-volatile memory, such as dynamic random access memory ("DRAM"), EEPROM, flash memory, or the like.

A block diagram of an autonomous intranet system 200 is illustrated in FIG. 2 wherein the system has two active data centers 204-1 and 204-2 according to one or more embodiments. As used herein, an active data center is a data center that is advertising a network address upstream, e.g., having a load balancer that advertises a single-host IP address upstream. An active data center may handle, e.g., receive, process, and/or send, network traffic, e.g., packets.

The embodiment illustrated in FIG. 2 includes a first data center 204-1 and a second data center 204-2 on different LAN segments A and B respectively. There are no geographic restrictions on the distances of network connections illustrated in FIG. 2, e.g., data center one 204-1 could be a distance away from data center two 204-2. The data centers may include load balancers 206-1 and 206-2, each advertising, 216-1 and 216-2 respectively, a common single-host IP address, e.g., 10.0.255.10/32, upstream to the IGP network cloud 202. Each bit of the single-host IP address may be part of the network address. Because the IP address is a single-host address, it is not advertised on a subnet basis. That is, because each bit of the single-host address may be used as the network address, there are insufficient bits reserved to be used for subnetting. The single-host IP address may be used to connect to devices in a data center where each device in a data center may be part of a LAN segment. Although the example IP address illustrated in FIG. 2 may appear in Internet protocol version four (IPv4) form, embodiments are not so limited. Embodiments may be practiced using Internet protocol version six (IPv6) and other network protocols.

Each load balancer may advertise the single-host IP address upstream for the data center, e.g., load balancer 206-1 may advertise 10.0.255.10/32 for data center 204-1 while load balancer 206-2 may advertise 10.0.255.10/32 for data center 204-2. In one or more embodiments, a load balancer, e.g., load balancer 206-1 may advertise the single-host IP address upstream through a router 210-2 interconnected with the load balancer 206-1. Although router 210-2 is illustrated outside of the data center 204-1, in one or more embodiments, the router 210-2 could be within the data center 204-1.

A number of routers, e.g., routers 210-1, 210-2, and 210-P, are illustrated to indicate that a number of routers may exist within the IGP network cloud 202, or elsewhere in the autonomous intranet system 200. The designator "P" is used to indicate that a number of routers may exist within the autonomous intranet system 200. Each link illustrated in FIG. 2 may be an IGP link, regardless of whether the link is within or to/from the IGP network cloud 202, e.g., traffic may be routed throughout the autonomous intranet system 200 using IGP. For example, traffic from client 208-1 could be routed to router 210-1, through the IGP network cloud 202, to router 210-2, and to data center 204-1, all using IGP. Thus, traffic from a client on the autonomous intranet system is routed to one of the data centers using IGP.

The embodiment illustrated in FIG. 2 represents two active data centers 204-1 and 204-2. Both data centers may advertise 216-1 and 216-2 the common single-host IP address. The single-host IP address may be advertised upstream using route health injection (RHI) to a number of routing tables of routers upstream, e.g., routers such as routers 210-1 and 210-2. Upstream routers, whether within IGP network cloud 202, such as router 210-1, or outside the cloud, such as router 210-2, may use a particular routing protocol, e.g., open shortest path first (OSPF), to select a network path for traffic between a client, e.g., client 208-1, and a data center, e.g., data center 204-1. In one or more embodiments, the network path selected by one or more routers for traffic from a client to a data center may be the topographically shortest route, e.g., the route which may provide the highest speed for traffic flow to/from the client, the fewest number of hops, and/or the lowest cost metric, depending on the particular routing configuration employed.

For a particular client session, traffic from a client, e.g., client 208-1, may be routed to one data center, e.g., data center 204-1. Although traffic levels may change during the particular client session, potentially altering the shortest network path between the client and data center, topographic control may be exercised over the autonomous intranet system such that actual persistence may be provided to the client, e.g., traffic from the client for the session may not be routed to more than one data center during the session. In contrast, non-autonomous networks connecting clients via the Internet may use BGP routing between more than one active data center and clients, reducing or eliminating the ability to use topographic control to provide session persistence for one or more clients, e.g., traffic from a particular client for a particular session may be routed to more than one data center in such instances.

The data centers 204-1 and 204-2 illustrated in FIG. 2 include load balancers 206-1 and 206-2 connected to a number of servers, e.g., web servers 212-1 and 212-2 and/or a number of server farms 214-1 and 214-2. As described above, a server farm may include a number of servers for performing a particular function. The number of servers and/or server farms illustrated herein does not limit the number or types of servers that may be used in a data center. For example, a data center could include multiple web servers, or a server farm including one or more web servers. The number of servers and/or server farms in data center 204-2 may provide redundant and/or backup functionality for the number of servers and/or server farms in data center 204-1, and vice versa, e.g., either data center may serve as a backup and/or redundant data center for the other data center. Data center 204-2 may provide the same or similar functionality as data center 204-1. Thus the number of servers and/or server farms in data center 204-2 may be counterparts to the number of servers and/or server farms in data center 204-1, e.g., web sever 212-2 in data center 204-2 may be a counterpart web server to web server 212-1 in data center 204-1.

As noted above, traffic from a particular client for a session may be routed to one data center, e.g., data center 204-1. As such, traffic from the particular client for the session may be routed to one or more servers and/or server farms in one data center, e.g., either to a server and/or server farm, e.g., server farm 214-1, or to a counterpart server and/or counterpart server farm, such as sever farm 214-2.

The number of servers and/or server farms in data center 204-1 may be on a particular layer two network 203-1 that is different than the layer two network 203-2 for the number of servers and/or server farms in data center 204-2. Such a network design may help prevent broadcast storms, particularly as compared to a network design including servers and counterpart servers on the same layer two network. The number of servers and/or server farms in data center 204-1 may have different network addresses than corresponding counterpart servers and/or server farms in data center 204-2. For example, server "SVR" in data center 204-1 may be assigned a network address of 10.1.1.2, while counterpart sever "SVR" in data center 204-2 may be assigned a network address of 10.2.1.2.

Figure 3:
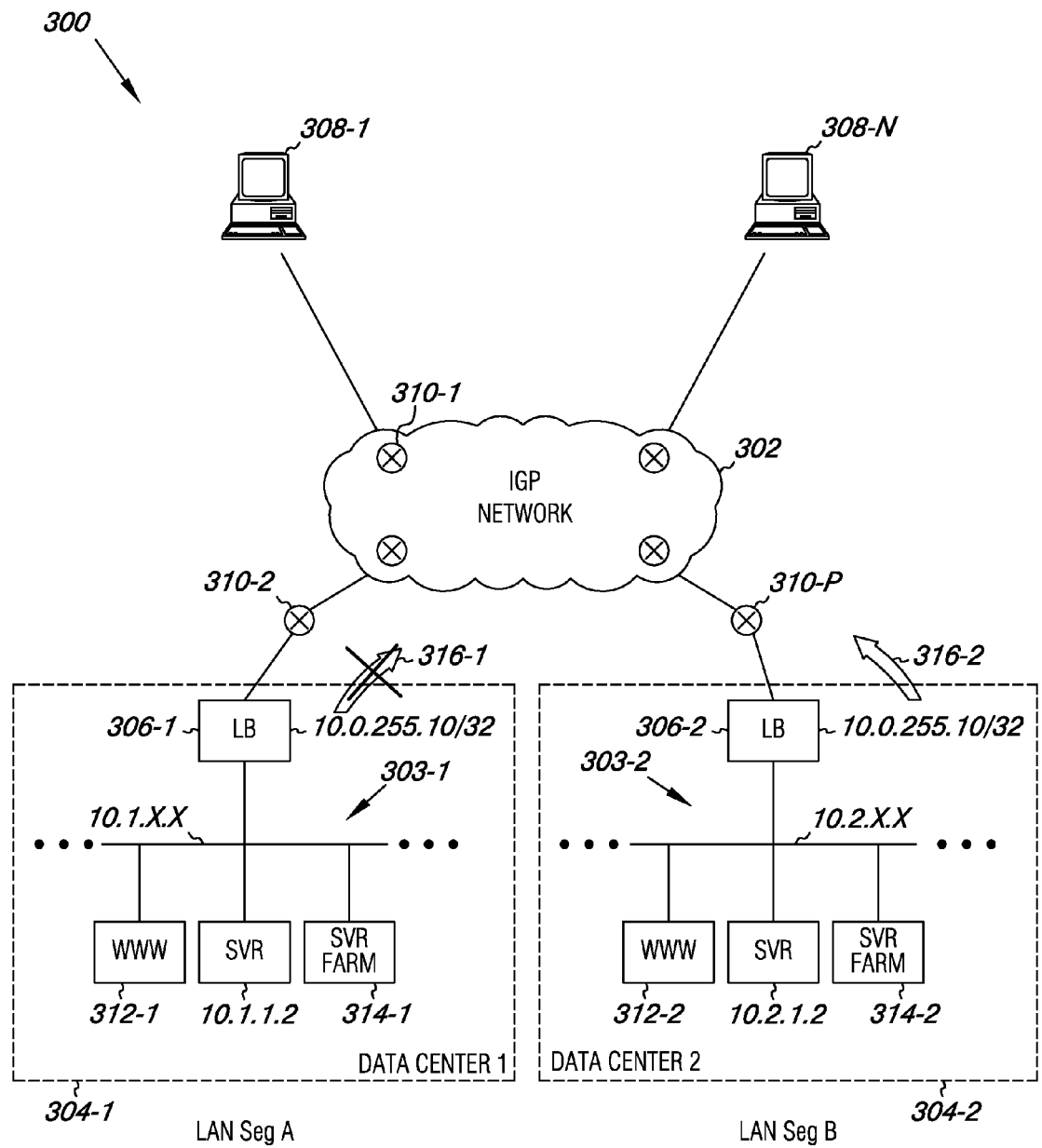
FIG. 3 illustrates a block diagram of an autonomous intranet system at failover according to one or more embodiments.

Referring to FIG. 3, a block diagram is illustrated of an autonomous intranet system 300 at failover according to one or more embodiments. The autonomous intranet system 300 may include data centers 304-1 and 304-2, each including a load balancer 306-1 and 306-2 respectively. When both data centers 304-1 and 304-2 are active, both load balancers 306-1 and 306-2 may advertise 316-1 and 316-2 a single-host IP address, e.g., 10.0.255.10/32, upstream for the respective data centers. In such instances, traffic may be routed according to a particular convention or protocol, e.g., OSPF. However, during a failover from data center one 304-1 to data center two 304-2, data center one 304-1 may cease to advertise 316-1 the single-host IP address, as indicated in FIG. 3 by the X mark through advertisement 316-1.

A load balancer, such as load balancer 306-1 may be configured to perform a health check on a number of servers in the data center associated with the load balancer, e.g., "WWW" server 312-1 and/or server farm 314-1 in data center 304-1. The load balancer may advertise the single-host IP address upstream for the data center when the number of servers pass the health check, e.g., when the results of the health check meet certain criteria. However, when the results of the health check fail to meet certain criteria, the load balancer may cease to advertise the single-host IP address, e.g., initiate a failover, for a particular data center. Certain criteria may include failure of all or a portion of the servers and various degrees of failure, among other criteria as will be understood by one of ordinary skill in the art. In such instances, upstream routers, e.g., router 310-2, may cease to route traffic to the particular data center. For example, if the "SVR" with a network address of 10.1.1.2 in data center 304-1 failed to meet certain criteria in a health check, the load balancer 306-1 could cease advertising the single-host IP address upstream. In such an instance, load balancer 306-2 would, however, continue to be advertising the single-host IP address for data center 304-2. Thus, routers within the autonomous system 300, including routers in IGP network cloud 302, could route traffic intended for the IP address 10.0.255.10/32, which previously would have gone to data center 304-1, to data center 304-2.

As described above, autonomous system 300 may include a number of clients, e.g., clients 308-1 and 308-N, connected to the IGP network cloud 302. The designator "N" is used to indicate that a number of clients may be connected to the network cloud 302. Network cloud 302 may include a number of routers, e.g., router 310-1. Traffic from clients may be routed to a topographically closest data center, e.g., according to OSPF protocol. In one or more embodiments, traffic from a number of clients may be balanced between more than one data center. For example, traffic from a number of clients may be balanced between data centers 304-1 and 304-2 using load balancers 306-1 and 306-2 according to a round-robin approach or other suitable techniques. Data centers 304-1 and 304-2 may be interconnected through a number of routers, e.g., router 310-2, and through the IGP network cloud 302. In one or more embodiments, data centers 304-1 and 304-2 may be connected via a direct dedicated line, e.g., a T3 fiber line. Accordingly, upon failover, e.g., when load balancer 306-1 ceases to advertise 316-1 the single-host IP address, traffic from a particular client, e.g., client 308-1, that had previously been routed to a first data center 304-1 may be routed to a second data center 304-2.

Likewise, the second load balancer 306-2 may perform a health check on a number of servers in the second data center 304-2. The second data center 304-2 may include a number of counterpart servers to the servers in the first data center 304-1 that may provide similar functionality. For example, "WWW" server 312-2 in the second data center 304-2 may be a counterpart web server to "WWW" server 312-1 in the first data center 304-1. When the results of the health check by load balancer 306-2 fail to meet certain criteria, the second load balancer 306-2 may cease to advertise 316-2 the single-host IP address upstream for the second data center 304-2. In such instances, traffic may be routed to the first data center 304-1, if it has not already initiated a failover, e.g., if the first load balancer 304-1 is advertising the single-host IP address upstream. Accordingly, traffic from a particular client, e.g., client 308-1 that was routed to the second data center 304-2, may be routed to the first data center 304-1 when the second load balancer ceases to advertise the single-host IP address.

In one or more embodiments, a manual failover may be initiated, e.g., from data center 304-1 to 304-2. For example, operators of autonomous system 300 may desire to take various servers in data center 304-1, e.g., "WWW" server 312-1, offline for maintenance. In such an instance, load balancer 306-1 may discontinue advertising 316-1 the single-host IP address upstream for the first data center 304-1. Accordingly, traffic from clients beginning a new session may be routed through the IGP network cloud 302 to the second data center 304-2. However, in such instances, operators of the autonomous system 300 may wish to allow currently active client sessions having traffic routed to the first data center 304-1, to complete. Accordingly, topographic control may be exerted over the autonomous system 300 such that existing client sessions continue to be routed to the first data center 304-1, while new client sessions are routed to the second data center 304-2.

According to some previous approaches, failover, e.g., for a web server such as server 312-1, could occur from a server having one IP address to a server having a different IP address. Such a failover could require a client, who may have domain name system (DNS) information cached for the website to refresh a DNS record before that client was able to reconnect after failover. However, according to one or more embodiments of the present disclosure, traffic from a client, e.g., client 308-1, may be routed to the second data center 304-2 transparently to the client and without refreshing DNS records. For example, the client may not receive an error message after a failover, e.g., when the first load balancer 306-1 ceases to advertise the single-host IP address after the results of a health check fail to meet certain criteria, because the second load balancer may advertise the same single-host IP address for the second data center 304-2. Thus, traffic may be rerouted without refreshing DNS records, e.g., as may be stored in cache, for a client.

Figure 4:
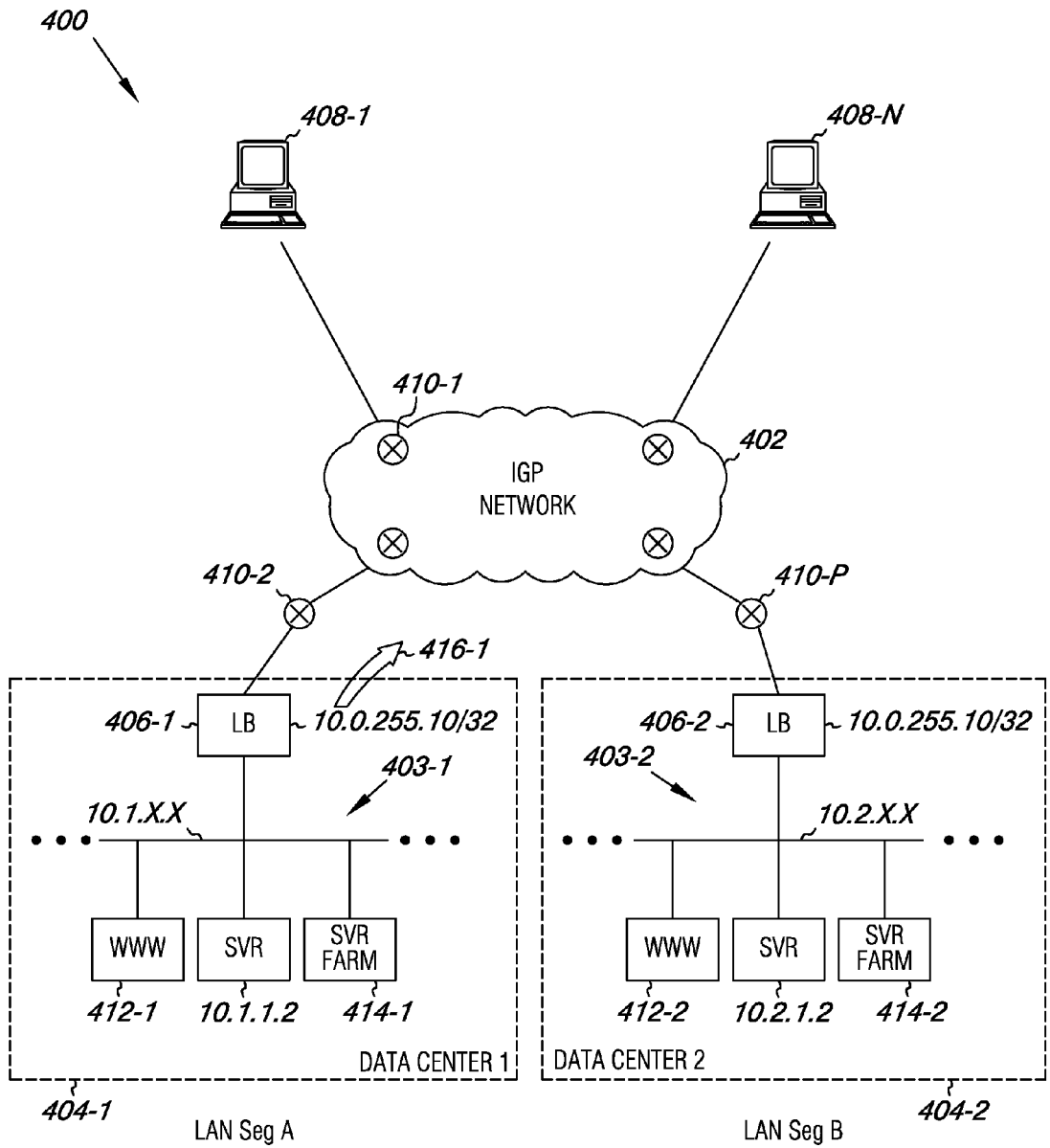
FIG. 4 illustrates a block diagram of an autonomous intranet system having at least one active data center according to one or more embodiments.

Referring to FIG. 4, a block diagram is illustrated of an autonomous intranet system 400 having one active data center 404-1 according to one or more embodiments. In the embodiment illustrated in FIG. 4, the first data center 404-1 may include a first load balancer 406-1 that is advertising 416-1 a single-host IP address upstream to the autonomous intranet system 400 including a number of routers, e.g., router 410-2, and routers in the IGP network cloud 402, e.g., router 410-1. The first load balancer 406-1 may advertise the single-host IP address, e.g., 10.0.255.10/32 to the second load balancer 406-2, e.g., through IGP network cloud 402 or through a direct interconnection, e.g., as illustrated in FIG. 1. Thus, the first data center 404-1 may be said to be "active." The second data center 404-2 may include a second load balancer 406-2 that is not advertising the single-host IP address upstream. Thus, the second data center 404-2 may be said to be "passive."

In one or more embodiments, the first load balancer 406-1 may advertise 416-1 the single-host IP address upstream based on received health check information from a number of servers in the first data center 404-1, e.g., "WWW" server 412-1, or server farm 414-1. For example, if information received from the number of servers indicates that the results of a health check fail to meet certain criteria, e.g., one or more servers are not functioning properly, then the first load balancer 406-1 may cease to advertise the single-host IP address, e.g., analogous to the "X" over advertisement 316-1 in FIG. 3. In such an instance, the second load balancer 406-2 may cease to receive the advertised single-host IP address from the first load balancer 406-1 and may begin advertising the single-host IP address upstream for the second data center 404-2, e.g., analogous to advertisement 216-2 in FIG. 2. Thus, active data center 404-1 may failover to passive data center 404-2. Accordingly, traffic from a client, e.g., client 408-1, that was being routed to the first data center may be routed to the second data center when the second load balancer advertises the single-host IP address upstream.

In one or more embodiments, advertising the single-host IP address upstream may include injecting a route to routing tables in one or more routers 410-1, 410-2, . . . , 410-P in the autonomous intranet system 400. For example, route health injection (RHI) may be used to advertise routes upstream. RHI may include performing a health check on a number of servers, e.g. performing a health check with load balancer 406-1 on servers in data center 404-1, and advertising the single-host IP address when the servers meet certain criteria of a particular health check. When one or more servers fail to meet certain criteria of a particular health check, the load balancer may cease to advertise the single-host IP address, as described above. Accordingly, upstream routers may be made "aware" that the route is no longer valid. When a second data center, e.g., data center 404-2 is advertising (or begins advertising) the single-host IP address, upstream routers may route traffic to that data center.

Embodiments that include virtual private networks (VPNs) may include the use of reverse route injection (RRI) to inject a route into a number of routing tables upstream from a load balancer, e.g., load balancer 406-1. For example, client 408-1 may have a secure tunnel connection between router 410-1 and router 410-2 as VPN endpoints for data center 404-1 via load balancer 406-1. If the first load balancer 406-1 ceases to advertise the single-host IP address and the second load balancer 406-2 begins advertising, using RRI, a new secure tunnel may be created for client 408-1, e.g., to router 410-P as a VPN endpoint. Accordingly, data center failover may be achieved while providing continuous service to a client such that the failover is transparent to the client.

Unlike some prior networks using BGP routing, the present disclosure enables, at least, an ability to provide data center failover without generating an error message to clients on the network. For example, using BGP routing, a routing table on a client's gateway router may not be updated until the "removed" route ages out and the router accepts another path to the IP address. Conversely, using IGP routing, e.g., with the autonomous intranet system 400, routing tables for routers through the autonomous system may be updated quickly, e.g., using link-state advertisements, such as OSPF routing protocol. A link-state advertisement may transport a routing topology to other routers in an OSPF area, e.g., autonomous system 400. Link-state advertisements may allow nodes in the autonomous system to receive a copy of other node's link-states to create a routing table for the autonomous system.

The first data center 404-1 may include a number of servers 412-1 and/or server farms 414-1 as described above. The second data center 404-2 may include a number of counterpart servers, e.g., "WWW" server 412-2, and/or server farms 414-2 as described above. The number of servers in the first data center 404-1 may be on a different LAN segment of the autonomous intranet system 400 and may have a different network address than the number of counterpart servers in the second data center 404-2. However, each of the number of servers in the first data center 404-1 may have a common subnet address and virtual host address with a corresponding counterpart server in the second data center 404-2, which may help simplify network address translation for traffic intended for a particular resource, e.g., a server or counterpart server, among other benefits.

Figure 5:
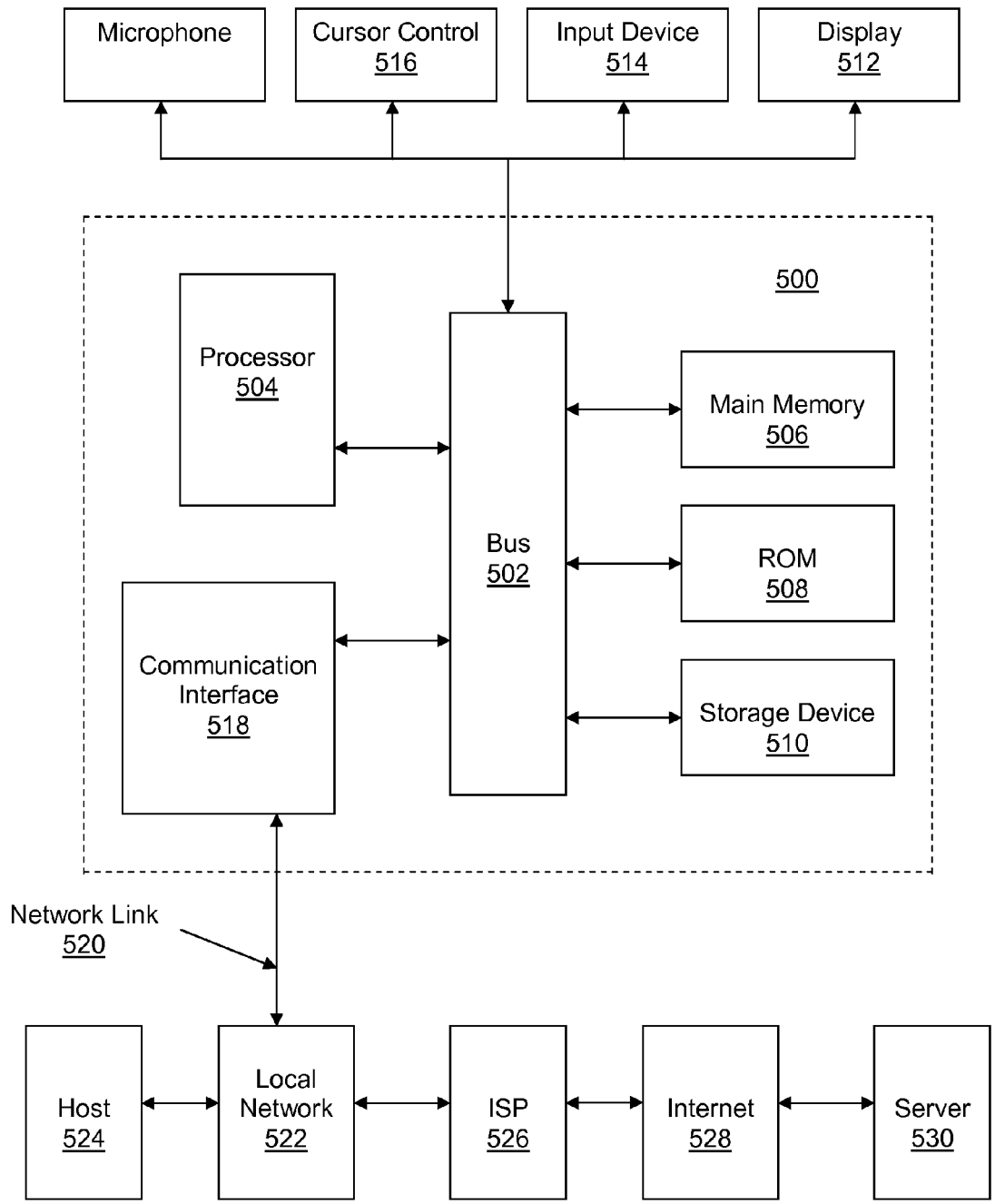
FIG. 5 illustrates a computer system upon which an embodiment or embodiments may be implemented.

Referring to FIG. 5, a block diagram illustrates an exemplary computer system 500 upon which process flows in accordance with principles of embodiments may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

One or more populating acts may be provided by computer system 500 in response to processor 504 executing one or more sequences of one or more instructions contained in main memory 506. Such instructions may be read into main memory 506 from another computer-readable medium or computing device readable medium, such as storage device 510. Execution of the sequences of instructions contained in main memory 506 causes processor 504 to perform processes described herein. One or more processors in a multi-processing arrangement may also be employed to execute the sequences of instructions contained in main memory 506. In other embodiments, hard-wired circuitry may be used in place of, or in combination with, software instructions. Thus, embodiments are not limited to any specific combination of hardware circuitry and software.

The term "computer-readable medium" or "computing device readable medium" as used herein refers to any medium that participates in providing instructions to processor 504 for execution. Such a medium may take many forms, including but not limited to, non-volatile media, volatile media, and transmission media. Non-volatile media include, for example, optical or magnetic disks, such as storage device 510. Volatile media include dynamic memory, such as main memory 506. Transmission media include coaxial cables, copper wire and fiber optics, including the wires that comprise bus 502. Transmission may also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer may read.

Various forms of computer readable media may be involved in carrying one or more sequences of one or more instructions to processor 504 for execution. For example, the instructions may initially be borne on a magnetic disk of a remote computer. The remote computer may load the instructions into its dynamic memory and send the instructions over a telephone line using a modem. A modem local to computer system 500 may receive the data on the telephone line and use an infrared transmitter to convert the data to an infrared signal. An infrared detector coupled to bus 502 may receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network, now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 may send messages and receive data, including program code, through the network(s), network link 520, and communication interface 518. In the Internet example, a server 530 might transmit a requested code for an application program through Internet 528, Internet service provider (ISP) 526, local network 522 and communication interface 518. One such downloaded application provides for, or participates in, presenting brand images. Other such downloaded applications may include banking applications, e-commerce applications, accounting applications, inventory tracking applications, and the like. The received code may be executed by processor 504 as it is received, and/or stored in storage device 510, or other non-volatile storage for later execution. In this manner, computer system 500 may obtain application code in the form of a carrier wave.

Referring to FIG. 1 through FIG. 5, routers that make up IGP Network 102, 202, 302, or 402 or other networks may use routing protocols to build route tables in order to efficiently direct traffic between devices or systems connected through the Internet. Exemplary routing protocols include Routing Information Protocol (RIP), Border Gateway Protocol (BGP), Intermediate System to Intermediate System (IS-IS), and Open Shortest Path First (OSPF) protocol. In any case, the routing tables specify how to connect one node, device, or system, such as a client, to another, such as a data center. The routing tables may be manually built. However, the routing tables usually are automatically built according to the routing protocols. For example, BGP works by establishing peer relationships between adjacent routers. The peer routers exchange route updates that reflect the network topology. The route updates are exchanged repeatedly to reflect changes to the network, such as routers going down and new routers coming online.

When a router advertises routing information to one of its BGP neighbors, that information is generally considered valid until the router explicitly advertises that the information is no longer valid or until the connection is lost or closed. To keep a connection open, each BGP router periodically sends keep-alive messages. These messages are typically 19 bytes long and sent every 60 seconds by default. In this manner, each BGP router maintains its own routing table. Based on its routing table, each BGP router selects the best route to use between every known node. In order to select the best route, a BGP routing table includes a number of attributes, which may be used to prefer one route over another.

For description herein, the order of steps may occur in a variety of sequences unless otherwise specifically limited. The various steps described herein may be combined with other steps, interlineated with the stated steps, and/or split into multiple steps. Similarly, elements have been described functionally and may be embodied as separate components or may be combined into components having multiple functions.

Not every potential embodiment has been described, and modifications and alterations to the described embodiments are available to those of ordinary skill in the art. The disclosed and undisclosed embodiments are not intended to limit or restrict the scope or applicability of that which is conceived of by the Applicants, but rather, in conformity with the patent laws, Applicants intend to fully protect all such modifications and improvements that come within the scope or range of equivalents of the claims below.

Although specific embodiments have been illustrated and described herein, those of ordinary skill in the art will appreciate that an arrangement calculated to achieve the same results may be substituted for the specific embodiments disclosed. This disclosure is intended to cover adaptations or variations of various embodiments. It is to be understood that the above description has been made in an illustrative fashion, and not a restrictive one. Combination of the above embodiments, and other embodiments not specifically described herein, will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter may also be found in less than all features of a single disclosed embodiment. Thus, the following claims are hereby incorporated into the Detailed Description, with each claim standing on its own as a separate embodiment.

What is claimed is:

1. An autonomous intranet system, comprising:
   a first data center including:
      a number of servers; and
      a first load balancer that receives health check information from the number of servers;
   a second data center including:
      a number of counterpart servers to the number of servers for the first data center; and
      a second load balancer;
   wherein the first load balancer advertises a single-host Internet Protocol (IP) address upstream and directly from the first load balancer to the second load balancer via a direct communication link based on received health check information from the number of servers, wherein the first load balancer ceases to advertise the single-host IP address for the first data center when results, received from the number of servers at the first load balancer, of a first health check fail to meet certain criteria;
   wherein the second load balancer advertises the single-host IP address upstream for the second data center when the second load balancer ceases to receive the advertised single-host IP address directly from the first load balancer via the direct communication link;
   wherein, in response to an initiated failover, traffic from an active client is permitted to complete a route to the first data center and traffic from a new client subsequent to the initiated failover is routed to the second data center; and
   wherein traffic from a client is routed to the second data center transparently to the client without refreshing domain name system (DNS) records because the single-host IP address is the same for both the first and the second data centers.

2. The autonomous intranet system of claim 1, wherein:
the number of servers are on a different local area network (LAN) segment of the autonomous intranet system than the number of counterpart servers;
each of the number of servers has a different virtual IP address than a corresponding counterpart server; and
each of the number of servers has a common subnet address and virtual host address with a corresponding counterpart server.

3. The autonomous intranet system of claim 1, wherein the first and second data centers are connected using interior gateway protocol (IGP).

4. The autonomous intranet system of claim 3, wherein traffic from clients is routed to the first and second data centers using open shortest path first (OSPF) protocol.

5. The autonomous intranet system of claim 4, wherein traffic from a client that was routed to the first data center is routed to the second data center when the second load balancer advertises the single-host IP address upstream.

6. The autonomous intranet system of claim 1, wherein the single-host IP address is advertised upstream to a number of routing tables using one selected from the group including: route health injection (RHI) and reverse route injection (RRI).

7. A method for operating an autonomous intranet system, comprising:
receiving health check information from a number of servers in a first data center with a first load balancer;
advertising, with the first load balancer, a single-host Internet Protocol (IP) address for the first data center upstream and directly from the first load balancer to a second load balancer via a direct communication link based on the received health check information from the number of servers, wherein the first load balancer ceases to advertise the single-host IP address for the first data center when results, received from the number of servers at the first load balancer, of a first health check fail to meet certain criteria; and
advertising the single-host IP address upstream with the second load balancer for a second data center having a number of counterpart servers to the number of servers for the first data center when the second load balancer ceases receiving the advertised single-host IP address directly from the first load balancer via the direct communication link;
wherein, in response to an initiated failover, traffic from an active client is permitted to complete a route to the first data center and traffic from a new client subsequent to the initiated failover is routed to the second data center; and
wherein traffic from a client is routed to the second data center transparently to the client without refreshing domain name system (DNS) records because the single-host IP address is the same for both the first and the second data centers.

8. The method of claim 7, wherein the method includes:
providing the number of servers on a different local area network (LAN) segment of the autonomous intranet system than the number of counterpart servers;
providing each of the number of servers with a different virtual network address than a corresponding counterpart server; and
providing each of the number of servers with a common subnet address and virtual host address with a corresponding counterpart server.

9. The method of claim 7, wherein the method includes connecting the first and second data centers using interior gateway protocol (IGP).

10. The method of claim 9, wherein the method includes routing traffic from clients to one of the first and second data centers using open shortest path first (OSPF) protocol.

11. The method of claim 10, wherein routing traffic includes:
routing traffic from a particular client to the first data center; and
routing traffic from the particular client to the second data center when the second load balancer advertises the single-host IP address.

12. The method of claim 7, wherein advertising the single-host IP address upstream includes advertising upstream to a number of routing tables using one selected from the group including: route health injection (RHI) and reverse route injection (RRI).

13. A computing device readable non-transitory medium having instructions stored thereon, which, when executed by a processor, cause a device to perform a method, comprising:
receiving a single-host Internet Protocol (IP) address advertised upstream from a first load balancer for a first data center based on received health check information from a number of servers in the first data center, wherein the first load balancer ceases to advertise the single-host IP address for the first data center when results, received from the number of servers at the first load balancer, of a first health check fail to meet certain criteria; and
receiving the single-host IP address advertised upstream from a second load balancer for a second data center, having a number of counterpart servers to the number of servers in the first data center, when the second load balancer ceases receiving the advertised single-host IP address directly from the first load balancer via a direct communication link;
wherein, in response to an initiated failover, traffic from an active client is permitted to complete a route to the first data center and traffic from a new client subsequent to the initiated failover is routed to the second data center; and
wherein traffic from a client is routed to the second data center transparently to the client without refreshing domain name system (DNS) records because the single-host IP address is the same for both the first and the second data centers.

14. The computing device readable medium of claim 13, wherein the method includes:
routing traffic to the first data center, wherein the number of servers are on a different local area network (LAN) than the number of counterpart servers;
routing traffic to the first data center, wherein each of the number of servers has a different virtual network address than a corresponding counterpart server; and
routing traffic to the first data center, wherein each of the number of servers has a common subnet address and virtual host address with a corresponding counterpart server.

15. The computing device readable medium of claim 13, wherein the method includes routing traffic to one of the first and second data centers using interior gateway protocol (IGP).

16. The computing device readable medium of claim 15, wherein routing traffic includes routing traffic from clients to one of the first and second data centers using open shortest path first (OSPF) protocol.

17. The computing device readable medium of claim 16, wherein routing traffic includes:
- routing traffic from a particular client to the first data center; and
- routing traffic from the particular client to the second data center when the single-host IP address is received from the second load balancer.

18. The computing device readable medium of claim 13, wherein advertising the single-host IP address upstream includes advertising upstream to a number of routing tables using one selected from the group including: route health injection (RHI) and reverse route injection (RRI).

* * * * *